(12) United States Patent
Kazama et al.

(10) Patent No.: US 7,425,179 B2
(45) Date of Patent: Sep. 16, 2008

(54) GAME DEVICE AND PROGRAM INCLUDING GAME PROCESSING AFTER REPRODUCING HISTORICAL PERFORMANCE

(75) Inventors: Takayuki Kazama, Saitama (JP); Hiroyuki Sasaki, Shinagawa-ku (JP)

(73) Assignee: Kabushiki Kaisha Sega, Tokyo (JP)

( * ) Notice: Subject to any disclaimer, the term of this patent is extended or adjusted under 35 U.S.C. 154(b) by 846 days.

(21) Appl. No.: 10/798,431

(22) Filed: Mar. 12, 2004

(65) Prior Publication Data
US 2004/0204230 A1    Oct. 14, 2004

Related U.S. Application Data

(63) Continuation of application No. 09/806,436, filed as application No. PCT/JP00/04184 on Jun. 26, 2000, now Pat. No. 6,749,503.

(30) Foreign Application Priority Data
Jul. 30, 1999    (JP)    ............... 11-218016

(51) Int. Cl.
*A63F 13/00* (2006.01)
(52) U.S. Cl. ............................ 463/24; 463/6
(58) Field of Classification Search ............ 463/1, 463/6, 24; 434/29–71
See application file for complete search history.

(56) References Cited

U.S. PATENT DOCUMENTS

| 4,342,454 | A | 8/1982 | Baer et al. |
| 5,261,820 | A | 11/1993 | Slye et al. |
| 5,366,376 | A | 11/1994 | Copperman et al. |
| 5,684,918 | A * | 11/1997 | Abecassis ............... 386/83 |
| 5,779,548 | A | 7/1998 | Asai et al. |
| 6,095,920 | A | 8/2000 | Sadahiro |

FOREIGN PATENT DOCUMENTS

| EP | 0715869 A1 | 6/1996 |
| EP | 0842681 A1 | 5/1998 |
| EP | 0916376 A1 | 5/1999 |
| JP | 2-283390 | 11/1990 |
| JP | 5-74589 U | 10/1993 |
| JP | 7-507402 A | 8/1995 |
| JP | 7-303760 | 11/1995 |
| JP | 9-75545 | 3/1997 |
| JP | 09234285 | 9/1997 |
| JP | 10-211360 | 8/1998 |
| JP | 11-42368 A | 2/1999 |
| WO | WO 93/24915 | 12/1993 |

OTHER PUBLICATIONS

Notice of Reasons for Rejection issued in Japanese Patent Application 11-218016 with partial English translation (7 pages).

* cited by examiner

*Primary Examiner*—Scott E Jones
(74) *Attorney, Agent, or Firm*—Finnegan, Henderson, Farabow, Garrett & Dunner, L.L.P.

(57) ABSTRACT

A game system enables continuation of a game after the game is ceased. The game system starts to reproduce a game screen of the state before the game is ceased and to start to continue the game after the screen results in a game ceased state.

20 Claims, 5 Drawing Sheets

GAME DEVICE AND PROGRAM INCLUDING GAME PROCESSING AFTER REPRODUCING HISTORICAL PERFORMANCE

This is a continuation of application Ser. No. 09/806,436, filed Oct. 31, 2001 now U.S. Pat. No. 6,749,503, which is a national-phase entry under 35 U.S.C. 371 of Int'l Application No. PCT/JP00/04184, filed Jun. 26, 2000, each of which are incorporated herein by reference.

TECHNICAL FIELD

This invention relates to a game device, particularly a game device for performing image processing, in a virtual 3 dimensional space, of a situation that an object such as an automobile is moved by responding to the operation of the game by a player.

BACKGROUND ART

In keeping with the development of computer graphics technology, simulated devices and game devices are broadly supplied to the public without the distinction of business or domestic use. As a genre of these devices, there is a popular driving (race car) game for competing over time and number of rotations by moving an automobile as an object on a course set in a virtual 3 dimensional space (game space).

A simulated device or a game device conducting this game ("game device") usually comprises a device body including a computer device for implementing a game program which is stored beforehand, a controlling tool ("controller") for providing the computer device with a controlling signal which directs the movement of an object expressed in the game, a display for displaying images in accordance with the development of the game which is developed by implementing the game program in the computer device, and a sound device for generating sound in accordance with the development of the game.

In this game device, an automobile (object) etc. which assumes the player as the driver is displayed on the display. The player operates the controller and provides the computer device with the information about the runway and running speed etc. The computer device conducts real-time calculations of the behavior of the automobile in accordance with the information, calculates the image data of the running state, and displays the image data on the display.

The image displayed on the display depicts not only the automobile of the player but also road signs etc. along with background scenery. The player reads the running state from the contents of the road signs indicating curves etc. and from the moving conditions of the surrounding view, and controls acceleration and deceleration through the controllers (accelerating pedal, lever, shift lever, etc.)

For example, in the simulated device, the more precise the controlling of the controller is, the more the travelling distance can be expanded. Furthermore, in the simulated device, insertion of a coin of 1 unit enables the operation of a predetermined time, and the more the driving technique progresses, the more the travelling distance and potential travelling hours can be expanded. However, if the driving technique is inexperienced, the travelling distance can not be expanded.

In any case, when the predetermined time has passed, the game screen ceases and operation by the controller can not be continued thereafter. Here, what is called a continuation screen is simultaneously displayed. This continuation screen has a count down method and if the count down starts from 10 seconds for example, it is possible to continue the game from the time when the game ended, by newly inserting a coin before the 10 seconds pass.

In short, it is possible to continue the game from the ending or pausing point of the game, without resuming the game from the original starting point of the beginning of the game. This continuing method has been conventionally and broadly implemented. If this method is used, it is possible to continue the game from the halfway point of the game, without returning to the original situation at the beginning of the game, even if the game has once ended or paused.

However, because the continuity of the game is once cut off when the game is ended or paused, if the game is suddenly resumed from the halfway point, the player can not fully cope with the flow speed of the game and loses the flow of the driving operation, and fails to manage the driving operation well. The interest of the game might be lost in a game device, such as a vehicle driving game or fighting game, which gives fast movements to a character, such as a vehicle or a person, in the game.

The object of this invention is to provide new continuation technology for game performance processings which can solve this problem.

DISCLOSURE OF THE INVENTION

In order to achieve this object, this invention is characterized in that it is a game device which comprises a processing means for performing a game which progresses in chronological order, based on an amount of the operation of a player from an operating means, a ceasing means for ceasing a performance state of the game, and a continuing means for continuing the game from the ceasing point of the game after reproducing the historical state of the performance of the game before the game was ceased.

According to the invention, the player can recognize the process which results in ceasing the game because the game screen before the ceased state of the game is reproduced. After this recognition, the game is resumed and continued from the ceased state of the game, therefore, the player consequently can manage well the operation of the game for the game processing after the game ceased.

Furthermore, in this invention, the player can better manage the game processing after the continuation of the game because, in the process of reproducing the game screen, the player operates the operating terminal and the inputs become effective to the game processing means gradually.

BEST MODE FOR CARRYING OUT THE INVENTION

The embodiment according to the present invention is hereinafter explained based on the attached diagrams.

The game device implemented in this embodiment provides a driving game for competing over lap time of a course (running line).

Figure 1:
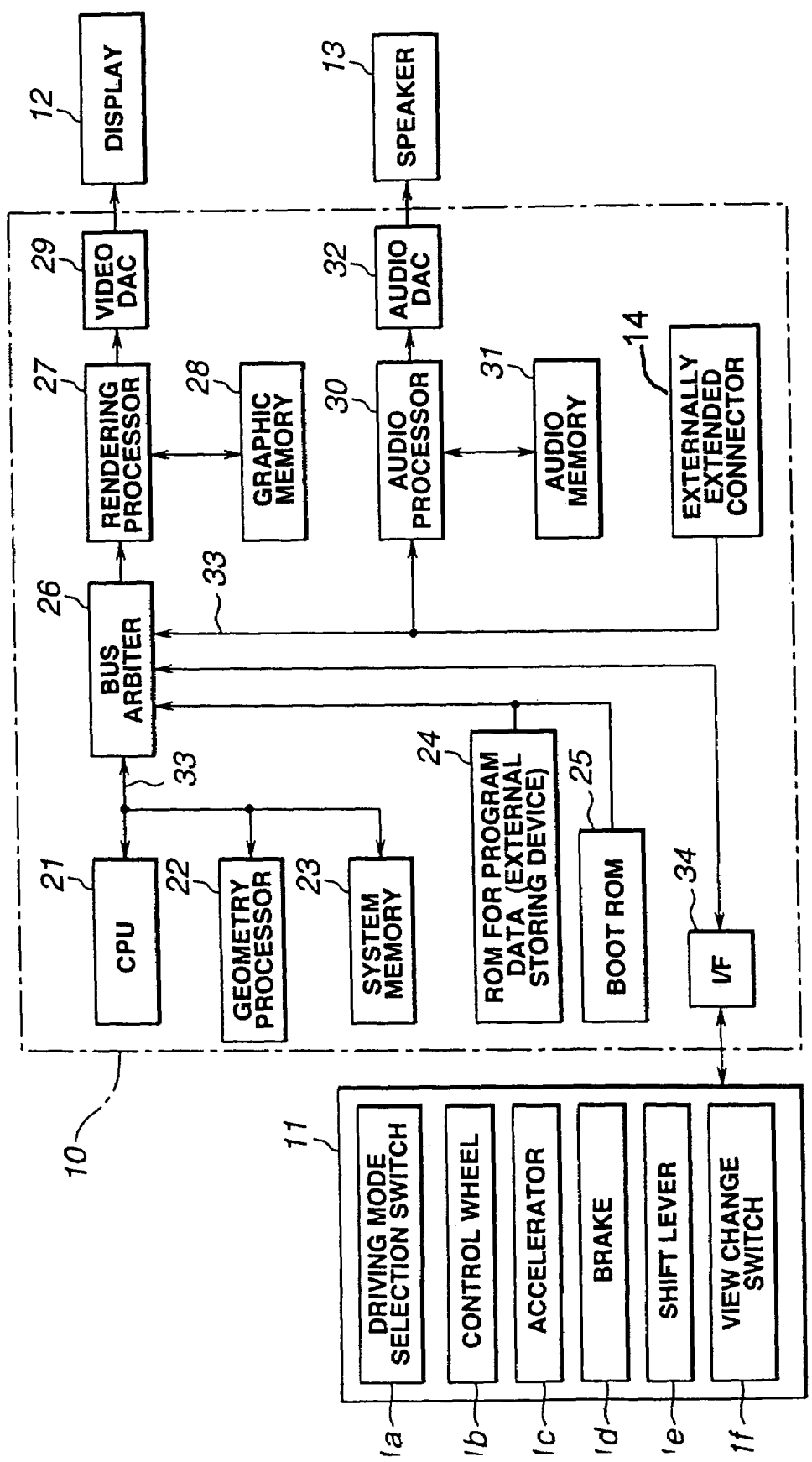
FIG. 1 is a block diagram of the game device according to an embodiment of the present invention.

FIG. 1 shows an electrical schematic block diagram representation of this game device. The game device includes game processing board 10 as shown in the diagram. The devices such as operating device 11, display 12, speaker 13, and externally extending connector 14, are electrically connected to game processing board 10. The player can play the driving game by operating each of the devices in operating device 11 while watching the game screen displayed on display 12.

The game processing board 10 includes, except a counter which is not illustrated, CPU (central processing unit) 21, geometry processor 22, system memory 23, ROM for program data 24, boot memory 25, bus arbiter for bus controller 26, rendering processor 27, graphic memory 28, video DAC 29, audio processor 30, audio memory 31, and audio DAC 32, and parts of these elements are connected to each other by bus line 33.

The CPU 21 implements each of the means described in the claims. The system memory 23 is structured such that it can memorize the historical state of the performance processing of the game. The historical state of the performance processing of the game means a processing state of the game in a predetermined period before the game is automatically ended or by pressing the pause button.

CPU 21 is connected to geometry processor 22 and system memory 23 via bus line 33, with its first system being connected to ROM for program data 24 and boot ROM 25 via bus arbiter 26 and bus line 33, its second system being connected to operating device 11 by way of I/F 34, its third system being connected to externally extending connector 14, its third system being connected to audio processor 30, its fourth system being connected to rendering processor 27, respectively. Moreover, rendering processor 27 is connected to graphic memory 28 and video DAC 29. Audio processor 30 is connected to audio memory 31 and audio DAC32.

A predetermined program and an image processing program are stored in system memory 23 beforehand. A program for system start up is stored in boot ROM 25 beforehand.

CPU 21 reads the system activating program stored in boot ROM 25 and activates the system, and then, performs the processings relating each kind of calculations and controls based on the program stored in system memory 23. The processings includes selecting a preferable driving mode from a plurality of driving modes which were set beforehand, the processing which is peculiar to each driving mode, behavior calculation (simulation) processing of a car, and calculation processing of special effects.

The calculation processing is to simulate the movement of the car in a virtual 3 dimensional space (game space). In order to perform this, the coordinate value of a polygon of the car in the virtual 3 dimensional ppace is decided, and after this, a conversion matrix and a form data (polygon data) for converting the coordinate value to a 2 dimensional sight coordinate system are designated to geometry processor 23. Furthermore, the polygon data means the coordinate data constellation of relative or absolute coordinates of each vertex of the polygon (a polygon: mainly a triangle, quadrangle) which is constituted of a plurality of vertexes.

In ROM for program data 24 (storage medium), the form data consisting of a plurality of polygons (3 dimensional data of a character, land form, and background etc. that are constituted of each vertex) is stored beforehand. This form data is delivered to geometry processor 22. Geometry processor 22 performs perspective conversion of a designated form data on the conversion matrix which is sent from CPU 21, and obtains the form data which is converted from the coordinate in the 3 dimensional virtual space to a sight coordinate system. This form data is sent to rendering processor 27.

Rendering processor 27 reads texture data from graphic memory 28, pastes the texture on the form data of the converted sight coordinate system, and outputs it to the frame buffer in the video DAC 29. The polygon screen (simulation result) of the car and the configuration of the ground (background) etc. and the scroll screen of the letter information etc. that are temporarily stored in the frame buffer are synthesized in accordance with a designated priority and the final frame image data is generated at certain intervals. This frame image data is given D/A conversion, sent to display 12, and displayed in real-time as a game screen.

Audio processor 30 generates sound data based on a direction from CPU 21 and outputs the data to speaker 13 via audio DAC 32. Because of this, the sound data is amplified in power and output from speaker 13 as a sound.

Moreover, operating device 11 is equipped with driving mode selection switch 11a, control wheel (steering) 11b, accelerator pedal 11c, brake pedal 11d, shift lever 11e, and view change switch 11f, etc. which the player operates. By operating these, the player can provide CPU 21 via I/F 34 with the driving information such as the driving mode selection information, steering angle information, acceleration information, deceleration information, speed change gear shift position information, and the information of the view point of the camera located in the virtual 3 dimensional space, while watching the display screen of display 12.

Preparation for the operation of the game is completed by the above structure and when the player sits in a predetermined position (the position where the display 12 is in front) and disposes his/her hands and feet in each of the devices of the operating device 11.

When the game starts, the player operates the car displayed on the screen while watching the images displayed on display 12. The images are set in a 3 dimensional virtual space and it is possible to operate each of the operating terminals (control wheel, gear, accelerator, brake) based on the changing images when there are straight and curved lines, upward or downward slopes, and obstacles. In addition to calculating the behaviors of the car from the amount of the operation of these terminals, the game processing board arranges the car on a running road. A virtual camera is disposed near the car (obliquely behind the car, or at the driver's eyes inside the car), and the images from the virtual camera are produced and displayed on the screen.

After the player starts driving and a predetermined time passes, the game processing board performs the controlling processing for ending the game (game over) as a manner of ceasing the game. At the point the game is over, the images on the screen of the game cease. When the game is over, a continuation display is provided. The continuation display has a clock display which counts down the seconds from 10 to 0 on the screen. If the player inserts a coin during the count down, it is possible to continue the game processing from the ceased state of the game, without ending the game completely and returning to the original starting point.

In this control processing to continue the game processing, as described, the conventional game device resumes the game processing from the screen in the ceased state at the point the game is over. On the contrary, the game device described in this embodiment continues/resumes the game processing from the state at the time the game is over after reproducing the past game state which caused the game to be over.

Figure 2:
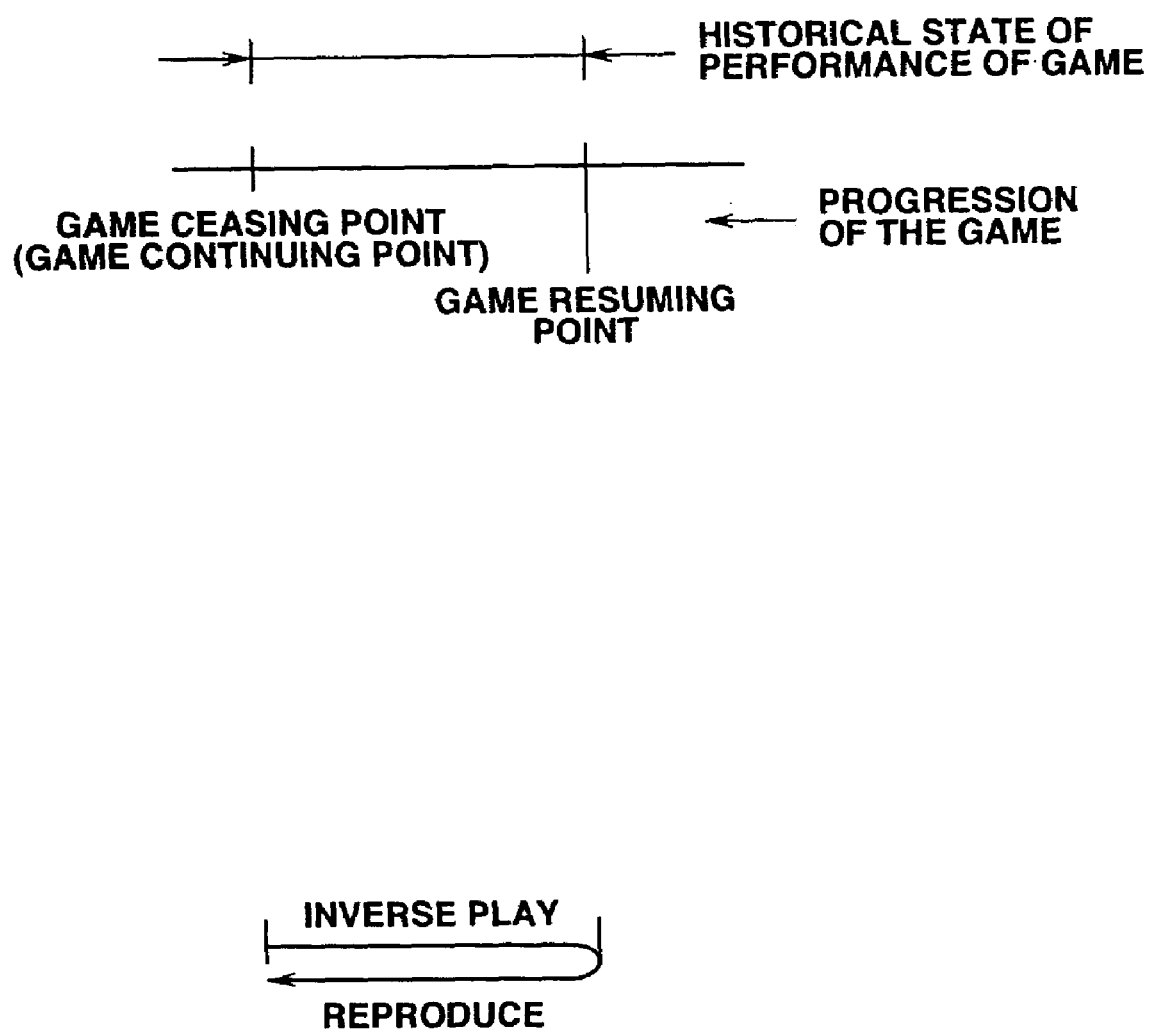
FIG. 2 is a characteristic diagram indicating a basic structure of a controlling manner to continue the game processing.

FIG. 2 is a basic structural diagram of the continuation control processing of this game. In FIG. 2, the game proceeds in the direction of time axis of the arrow. A game ceasing point means the time and place the game is over. A game resuming point means the past time and place of the game which lead to the game ceasing point. The successive game processing data from the game ceasing point to the game resuming point is stored in the described system memory. The game processing state between both points corresponds to the historical state of the performance of the game which is the history of the progression of the game.

The historical state of the performance of the game, for example, corresponds to a series of data of the game processing of a predetermined time (some seconds) and distance. As such data, there is the screen data itself which indicates the game processing state of the past, or the calculation values of the player's operation data or of the coordinates etc. of the objects which were calculated based on the operation data. In the latter case, the game processing board recalculates and reproduces the game screen from the game resuming point to the game ceasing point based on this calculation value.

The controlling manners to continue the game processing in FIG. 2 are as follows. A manner to jump back to the game resuming point from the game ceasing point and reproduce the historical state of the performance of the game from the game resuming point. A manner to inversely play the historical state of the performance of the game from the game ceasing point to the game resuming point and then reproduce this historical state of the performance of the game.

The reproducing amount of the historical state of the performance of the game is as follows. The performance history reproducing amount of the game, in short, an interval from the game ceasing point to the game resuming point can be fixed or changeable. In the former case, the interval is a predetermined time, for example, several seconds, or, a predetermined distance number, for example, 50-100 m. In one example of the latter case, the game performance history reproducing amount is changed according to the characteristic value of the game. One example of such value is the processing speed of the game such as the speed of a virtual car at the game ceasing point. For example, when the speed of the car is high, the reproducing amount is large. Moreover, the game board can change the reproducing amount depending on the amount of time which has passed between the pause or ceasing of the game and the resumption of the game. Furthermore, if the player or the keeper of the game device sets the command input for optionally setting the reproducing amount in a predetermined storage area of the game board, it means, for example, that the game processing board controls to inversely play the screen during all the time the player continues to push a predetermined operation button at the time of inverse playing.

And yet, the reproducing, not of the game performance history itself from the game resuming point to the game ceasing point (game continuing point), but of the alteration of the history can be allowed as an embodiment of the present invention. As a manner of such reproducing, the producing manner in the event that the player operated ideally can be used. For example, when the game is over right after the car had a collision (crash), even if the game continues (continue), it is likely that there will be another crash because the operation is proceeded after the reproducing is performed from the game resumption to the crash, therefore, the game performance history may be altered and reproduced in a manner which does not include or is not liable to cause a crash, moreover, as described hereinafter, a reproducing manner which escapes from resulting in a game situation that the player does not desire at the game ceasing point is possible by making the operation input by the player effective from the game resuming point.

Furthermore, while reproducing the historical state of the performance of the game, it is possible to feedback the control wheel operation manner which the player has operated to the control wheel input device. As a result, during the reproducing period of the historical state of the performance of the game which leads to a game continuing point, the player can sparely feel the control wheel operation and proceed to the game continuing state smoothly.

When the control in FIG. 2 is applied to the game device, a game screen, in which the car turns back from the game ceasing point to the game resuming point, is displayed, and then a screen, in which the car advances from the game resuming point to the game ceasing point, is displayed. Continuation of the game processing becomes effective from the point when the car reaches the game ceasing point. In this sense, the game ceasing point coincides with the game continuing point. Provided however, the game continuing point where the continuation of the game processing is started does not have to coincide with the game ceasing point. For example, the game continuing point can be slightly before the game ceasing point.

Figure 3:
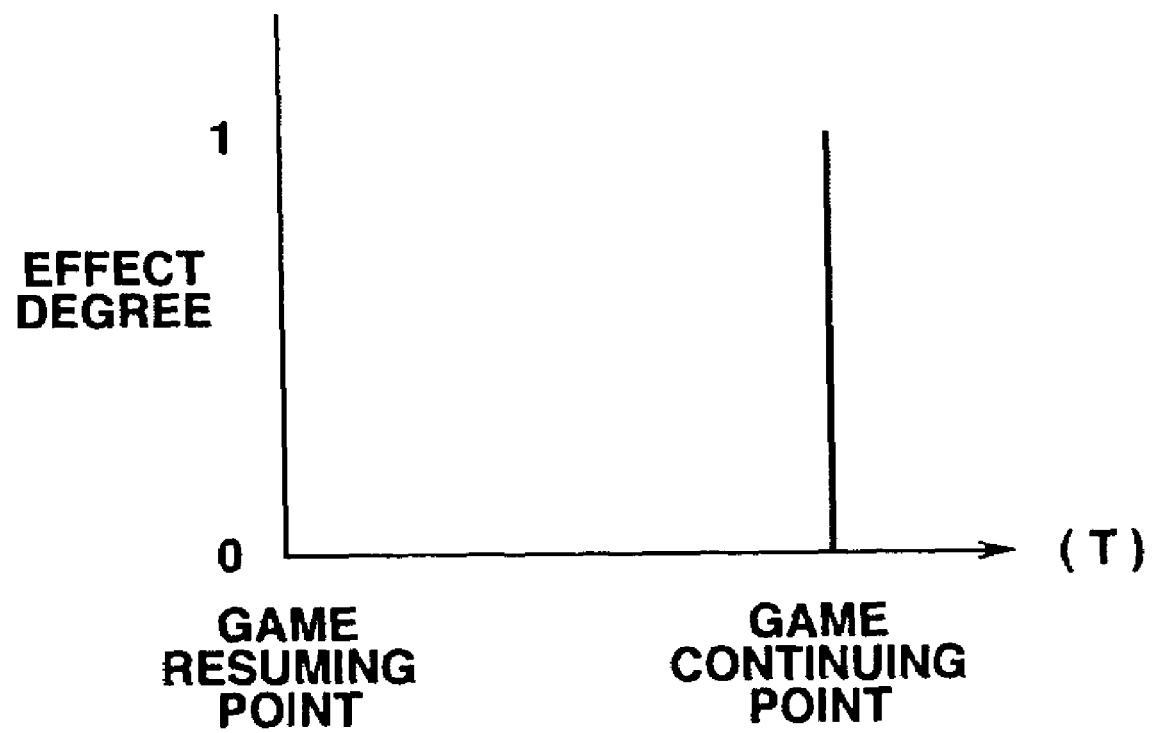
FIG. 3 is a diagram indicating the relationship between the amount of the operation of the game by the player and the game processing, during the reproduction period of the game state history.

Next explained is the relationship between the continuation of the game and the operation when the player operates the input means such as a control wheel and brake. In FIG. 3, the effect degree means the degree in which the amount of the operation reflects the game professing, and if the effect degree is 1, it means that almost all of the amount of the operation reflects the game processing. In the usual game performance processing period, the effect degree is 1. When the effect degree is 0, it means that the amount of the operation does not influence the game processing at all. The effect degree becomes 1 from the game continuing point and it becomes 0 from the game a resuming point to the game continuing point. In short, even if the player operates the input terminals from the game resuming point to the game continuing point, the player can not control the car at all.

Figure 4:
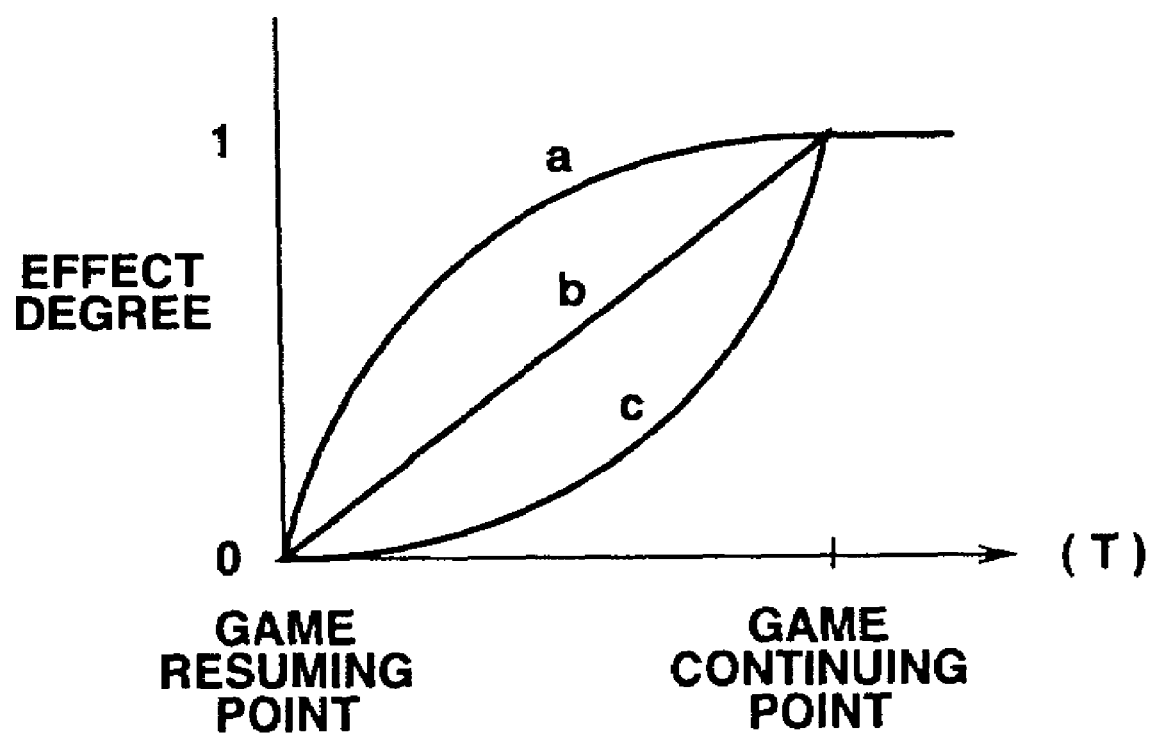
FIG. 4 is an altered example of the diagram in FIG. 3.

FIG. 4 is an altered example of FIG. 3. It indicates the situation where the described effect degree changes gradually from 0 to 1 from the game resuming point to the game continuing point. In FIG. 4, "a" indicates a case when the change rate of the effect degree is high at the game resuming point, and "c" indicates a case when the change rate of the effect degree is high at the game continuing point. Further "b" indicates that the rate of change is constant from the game resuming point to the game continuing point. In the case of the embodiment shown in FIG. 4, the memory stores the behavior calculation value of the car etc. from the game resuming point to the game ceasing point, and because of this, the game device adds the operation value of the player gradually to the storage value, conducts the behavior calculations, and continues the game from the game continuing point while reproducing the images of the calculation result. The game data after the game continuing point is the player's score value in the game. The player can make the situation after the game continuing point more favorable than the situation at the game ceasing point by taking advantage of the input means in the time from the game resuming point to the game continuing point.

When the effect degree (f) is from 0 to 1, the game processing board multiplies the value of this f with the amount of the operation of the player and delivers it to the game processing means, and the game processing means performs a predetermined calculation processing regulated by the game program, by using the input values after the amendment.

In the embodiments in FIG. 3 and FIG. 4, the following control operation can be implemented additionally. In the game ceasing state, there are times when the amount of the operation of the input means finish a certain situation. For example, it is a case the game becomes over while the car is driving on a curved section of the halfway of the course. In this case, from the game resuming point to the game continuing point, the game processing board controls the control wheel from the neutral position of the operating angle of the control wheel to the operating angle at the point the game is over. Furthermore, the described system memory is equipped with a specific memory area for renewing and storing the game state, which is within a predetermined time, in order during the game performance period.

Another embodiment is explained next. In this embodiment, when the game is temporarily ceased by pressing the pause button, the game processing board performs a control operation to continue the game, which is to be explained hereinafter. Moreover, in the game device having a pause function, the game is continued from the pausing state by operating the pause button again. Conventionally, the game is continued immediately from the pausing state, however, in the game device according to this embodiment, the control operations in FIG. 2 to FIG. 4 can be implemented.

The different point of this embodiment from the described embodiments is the following point. During the time from the game resuming point to the game continuing point, the game processing board provides a display indicating such meaning as "automatic reproducing" for example. The game device has a means which allows the choice of whether to continue the game from the game ceasing point or to continue the game processing after reproducing the described historical state of the performance of the game. The game processing board displays on the displaying means the time required from the game resuming point to the game continuing point, or it displays on the displaying means the time required from the game resuming point to the game continuing point in a count down method. Furthermore, the storing method of the game situation is as follows.

Figure 5:
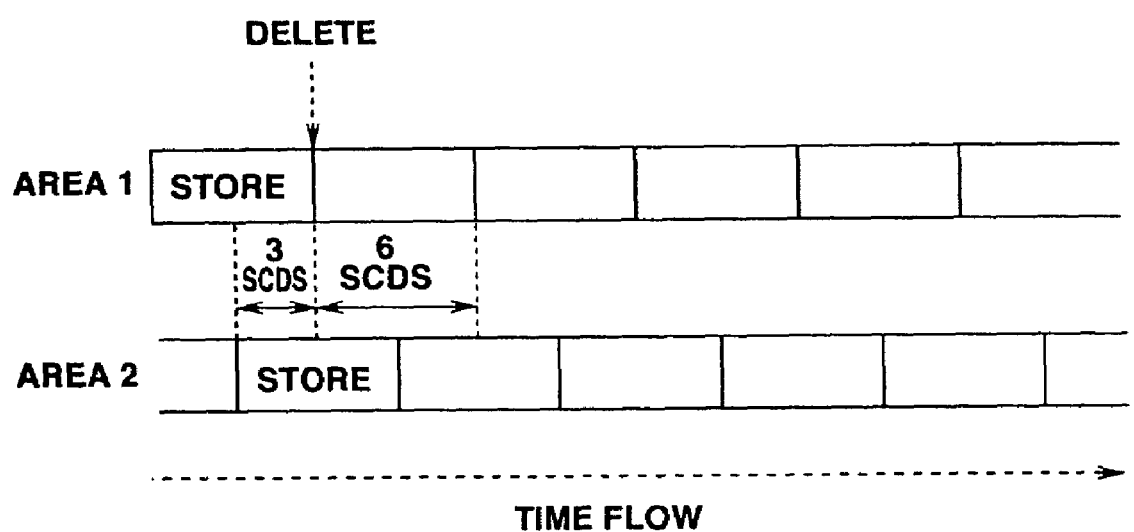
FIG. 5 is a basic structure of a continuation system of the game according to other embodiments of the present invention.

FIG. 5 is a schematic representation explaining this storing method. The system memory is equipped with a memory part for storing the 2 historical states of the performance of the game of the area 1 and area 2. This memory system corresponds to a case when the time from the game resuming point to the game continuing point is 3 seconds, in short, a case when the automatic reproducing time is 3 seconds.

Both of area 1 and area 2 are structured such that they can renew and store, for every 6 seconds, all the game processing data in such period. The timing of each storing area to start storing is shifted by 3 seconds. At the point of pushing down the pause button, the game processing board reads the data of the area which stores for more than 3 seconds. The data which was read is the data of more than 3 seconds and the automatic reproducing is performed in either method described hereinafter.

A method to automatically reproduce all the stored data of more than 3 seconds and to implement a count down display from 3 seconds before the game continuing point can be practiced. A method to reproduce, during the pause, at high-speed the stored part of more than 3 seconds which was stored, cease the screen at the point 3 seconds before the game continuing point, and, after the pause is cancelled, perform reproducing from 3 seconds before the game continuing point as well as implement the count down display, can be practiced.

By providing area 1 and area 2, the game device has an effect such that the game situation of more than a predetermined time is successively stored as history no matter at which point the game processing is ceased.

Furthermore, this embodiment gives the example of a driving game and explains it, however, if a game is in a form where a character rapidly moves, such as a fighting game, it is particularly preferable to apply the present invention. The player has to correspond to rapid movements of characters when the game is continued after it was ceased.

And yet, there is a conventional starting method of a game called a rolling start. The rolling start is to start a race while running a car beforehand. During the running period of the car before the start, the input operation of a player is not effective to the game processing board. When comparing this rolling start game with the game control according to the present invention, they are similar in a respect that the car is running until it reaches the game continuing point, however, the present game control is different from the game processing for the rolling start in the respect that the operation of the player is 100% or to some extent effective to movement of the car before it reaches the game continuing point.

Different from the continuation or pause, the game resuming point in the rolling start is always the same, and the rolling start does not need to make the operation of the player effective when reproducing the game because the place which does not often require the operation is usually chosen as a position to switch the operation to the player.

POSSIBILITY OF INDUSTRIAL USE

According to the present invention, because it is possible to continue a game while reproducing the past game situation, the player can conduct the game processing smoothly from the ceasing point of the game.

What is claimed is:
1. A game device, comprising:
a processing means for performing a game which progresses, in chronological order, based on an operation of an operating means by a player;
a ceasing means for temporarily ceasing a performance state of the game at a cease point according to the operation by the player;
a recording means for, while the game is progressing, progressively recording a historical state of a performance of the game for a predetermined duration of time;
a reproducing means for reproducing the historical state of the performance of the game; and
a continuing means for continuing the game performance after the game has ceased and for automatically enabling operation by the player from the cease point, wherein the continuing processing occurs automatically after the historical state of the performance of the game from a resume point to the cease point is reproduced, and the faster a performing speed of the game at the game cease point, the greater an interval of reproduction from the game cease point of the historical state of the performance of the game.
2. A game device according to claim 1, wherein said continuing means starts to continue the processing of the game from the game cease point.

3. A game device according to claim 2, wherein said continuing means reproduces the historical state of the performance of the game from a point before the cease point to the game cease point.

4. A game device according to claim 2, wherein said continuing means reproduces the historical state of the performance of the game up to the game cease point.

5. A game device according to claim 2, wherein said continuing means is structured to make an operation input from the player to said processing means effective in the reproducing period of said historical state of the performance of the game.

6. A game device according to claim 2, wherein said continuing means is structured to make an operation input effective after said historical state of the performance of the game results in the game cease point.

7. A game device according to one of claims 1 to 4, wherein a reproducing amount of the historical state of the performance of the game is controlled according to a processing state of the game at the time that the game was ceased.

8. A game device according to claim 4, wherein said continuing means reproduces the historical state of the performance of the game of a predetermined time before the game cease point.

9. A game device according to one of claims 1 to 3, wherein said continuing means is structured to selectively display a count down while reproducing the game performance history until the game cease point.

10. A game device according to one of claims 1 to 3, wherein said ceasing means performs processing to end the game.

11. A game device according to one of claims 1 to 3, wherein said ceasing means implements a pause of the game.

12. A game device according to claim 1 or 2, wherein said continuing means reproduces said historical state of the performance of the game on a condition that there is an input to continue the game within the predetermined time, and if there is no such input within the predetermined time, said continuing means ends the game.

13. A game device according to claim 1 or 2 wherein said continuing means is structured to display a game screen before reaching the cease point of the game, while reproducing the historical state of the performance of the game.

14. A game device according to claim 13, wherein said continuing means is structured to inversely reproduce on displaying means a virtual game screen in which the game processing results in the cease point, before starting to reproduce the historical state of the performance of the game.

15. A game device according to one of claims 1, 2, or 5, wherein said continuing means is structured to control an input terminal of an input means so that the input terminal in said input means receives an amount of the operation at the game cease point, after said game historical state of the performance of the game results in said game cease point.

16. A game device according to one of claims 1 or 2, wherein said continuing means is structured to display on a displaying means a time from a beginning of reproducing the historical state of the performance of the game to said game cease point.

17. A game device according to claims 1 or 2, comprising a means for reproducing by an operating means an operation input manner, which is given by said player to said operating means in a period of game performance history, while reproducing said historical state of the performance of the game.

18. A computer-readable medium storing computer-executable instructions for performing a method by a game device, the method comprising:
  performing a game which progresses, in chronological order, based on an operation of an operating means by a player;
  temporarily ceasing a performance state of the game at a cease point according to the operation by the player;
  while the game is progressing, progressively recording a historical state of a performance of the game for a predetermined duration of time;
  reproducing the historical state of the performance of the game; and
  continuing the game performance after the game has ceased and automatically enabling operation by the player from the cease point, wherein the continuing processing occurs automatically after the historical state of the performance of the game from a resume point to the cease point is reproduced, and the faster a performing speed of the game at the game cease point, the greater an interval of reproduction from the game cease point of the historical state of the performance of the game.

19. The computer-readable medium according to claim 18, wherein the processing of the game is continued from the game cease point.

20. A game device, comprising:
  a processing means for performing a game which progresses, in chronological order, based on an operation of an operating means by a player;
  a ceasing means for temporarily ceasing a performance state of the game at a cease point according to the operation by the player;
  a recording means for, while the game is progressing, progressively recording a historical state of a performance of the game for a predetermined duration of time;
  a reproducing means for reproducing the historical state of the performance of the game; and
  a continuing means for continuing the game performance after the game has ceased and for automatically enabling operation by the player from the cease point, wherein the continuing processing occurs automatically after the historical state of the performance of the game from a resume point to the cease point is reproduced, and the faster a performing speed of a virtual car operated by the player, the greater an interval of reproduction from the game cease point of the historical state of the performance of the game.

* * * * *